United States Patent [19]

Hiltunen et al.

[11] Patent Number: 5,759,549

[45] Date of Patent: Jun. 2, 1998

[54] PROCESSES FOR THE SEPARATIN OF LIPIDS

[75] Inventors: Raimo Vilho Kari Hiltunen. Selkamerenkatu; Heikki Juhani Vuorela. Karrby. both of Finland

[73] Assignee: Helsinki University Licensing, Ltd.. Helsinki. Finland

[21] Appl. No.: 345,039

[22] Filed: Nov. 25, 1994

[51] Int. Cl.$^6$ .................. A61K 35/78; C11B 1/00
[52] U.S. Cl. .................. 424/195.1; 554/8; 554/20
[58] Field of Search .............. 424/195.1; 514/783. 514/784; 260/412.8; 554/8, 20

[56] References Cited

U.S. PATENT DOCUMENTS

| | | | |
|---|---|---|---|
| 3,843,824 | 10/1974 | Roselius et al. | 426/386 |
| 4,061,566 | 12/1977 | Modell | 210/32 |
| 4,124,528 | 11/1978 | Modell | 252/411 |
| 4,260,639 | 4/1981 | Zosel | 426/478 |
| 4,749,522 | 6/1988 | Kamarei | 260/412.8 |
| 5,478,585 | 12/1995 | Isono et al. | 426/417 |
| 5,487,981 | 1/1996 | Nivens et al. | 435/30 |

FOREIGN PATENT DOCUMENTS

| | | |
|---|---|---|
| 2 005 293 | 11/1971 | Germany . |
| 62-134042 | 6/1987 | Japan . |
| 1057911 | 2/1967 | United Kingdom . |
| 1111422 | 4/1968 | United Kingdom . |
| 1346134 | 2/1974 | United Kingdom . |
| 1 400 098 | 7/1975 | United Kingdom . |
| WO 92/08363 | 5/1992 | WIPO . |

OTHER PUBLICATIONS

*Monosaccharides—Their Chemistry and Their Roles in Natural Products*, Ed. Collins & Ferrier. (John Wiley & Sons). p. 4. (1995).
*Advances in Applied Lipid Research (vol. 1).* Bartle & Clifford. (JAI Press). pp. 217–264. (1992).
Demirbuker et al.. *J. Microcol. Separations*, vol. 5(2): 141–147. (1993).
*Thermally Generated Flavors (ACS Symposium Series 543).* Ed. Parliment et al.. pp. 95–101. (1994).
*Supercritical Fluid Engineering Science (ACS Symposium Series 514).* Ed. Kiran and Brennecke. pp. 228–235. (1993).
H. Vuorela et al.. "Extraction of the Volatile Oil in Chamomile Flowerheads Using Supercritical Carbon Dioxide." vol. 5. pp. 81–84. Flavour and Fragrance Journal (1990).

*Primary Examiner*—John Kight
*Assistant Examiner*—Howard C. Lee
*Attorney, Agent, or Firm*—Marshall. O'Toole. Gerstein. Murray & Borun

[57] ABSTRACT

Materials and methods are presented for the isolation of lipids from a mixture of lipids using a supercritical fluid extraction process. Lipids are isolated by methods according to the invention in an amount approximately equal to the amount of the specified material in the mixture prior to extraction.

27 Claims, 4 Drawing Sheets

PROCESSES FOR THE SEPARATIN OF LIPIDS

FIELD OF THE INVENTION

The present invention generally relates to materials and methods for the separation of lipids using supercritical fluid extraction.

BACKGROUND OF THE INVENTION

Lipids play an important role in cellular biology. For example, in biological membranes, lipids may affect enzymatic activity and the physical nature of the membrane, including permeability. Drugs which have as their active agent phospho- and/or glyco-lipids are used as, inter alia, nutritional additives. Lipids derived from neural tissue have also been used in the form of lipid extracts in oral cancer therapies.

Lipids contained in the brain, bone marrow, and nerve tissue, namely, the neurolipids, may be divided into three main groups. Those groups comprise cholesterols (CL), phospholipids, and cerebrosides. Two subgroups of phospholipids (PL), one comprising glycerophospholipids, including phosphatidylcholines (PC), phosphatidylethanolamines (PE), phosphatidylserines (PS), and phosphatidylinositols (PI), and the other comprising sphingomyelins (SM) may also be distinguished. The cerebrosides (Cer) and the sulfate esters of cerebrosides (sulfatides) are glycolipids (GL). Triglycerides are present only in peripheral nerve tissue.

It is known in the art to separate polar lipids, such as phospholipids and glycolipids, from other lipids, especially neutral lipids such as cholesterol, using liquid extraction with a suitable solvent, such as acetone, which does not dissolve phospholipids. A disadvantage of acetone extraction is that it is not completely selective and the product invariably contains small amounts of solvent residue which is difficult to remove. It is also difficult to obtain a product, the polar lipid composition of which corresponds to that present in the tissue from which a sample is obtained.

Polar lipids have also been purified from non-polar lipids by adsorbing them to the surface of an adsorbent material from an acetone-dichloromethane mixture. By using a predetermined solvent ratio, the adsorbed polar lipids are precipitated while the neutral lipids remain in solution. However, co-precipitation of solvents together with the lipids on the adsorbent material makes the removal of solvent residue difficult.

A recent method used for the separation of various substances is supercritical fluid extraction (SFE). In a supercritical fluid extraction processes, the pressure and temperature used for extraction are above the critical pressure and temperature, respectively, of the extraction solvent. (The critical temperature is the highest temperature at which two forms of the same substance, liquid and gas, are simultaneously present. Above the critical temperature it is not possible to liquefy a gas by raising pressure. The critical pressure is the pressure at which the gas liquefies at the critical temperature.) At the supercritical state, the density and viscosity of a gas are low and the diffusion capability is high compared to the corresponding values of the liquid form. However, the density of the gas is still sufficiently high to provide for high solubilities, but the viscosity and diffusion are close to the corresponding values of the gas form. Such a combination of physical parameters leads to fast extraction and fast separation. By changing the temperature and pressure, it is possible to control the solubility capacity of the gas over a wide range.

Supercritical carbon dioxide has been used for the extraction of various lipid-bearing materials, such as cocoa fat. Supercritical carbon dioxide has also been used for the extraction of caffeine from coffee beans and coffee oil. The relation between the density of carbon dioxide to pressure and temperature is shown in FIG. 1.

It is also known to use supercritical fluid extraction in a process for treating wastewater (See, e.g., U.S. Pat. Nos. 4,061,566 and 4,124,528), wherein impurities are removed by adsorbing them to an adsorbent material, such as activated carbon. The loaded activated carbon is thereafter subjected to a supercritical fluid extraction process using carbon dioxide as the extractant. The supercritical fluid with dissolved adsorbate is then subjected to a physical treatment which renders it a non-solvent for at least a portion of the adsorbate in order to separate the supercritical fluid and the adsorbate.

It is also known to facilitate the dissolution of a substance to be extracted and to improve the extraction result by controlling the distribution coefficient of the substance in the fluid. This may be accompanied by fine-regulating extraction conditions, such as the polarity of the extraction system by using additives or modifiers.

However, attempts to separate polar lipids from neutral lipids by subjecting a lipid mixture to a supercritical fluid extraction process have not been successful. A major difficulty appears to be a channeling phenomenon (resulting in a hardening of the lipid formation which restricts fluid flow to "channels" therein) which occurs within the lipid mixture to be treated, preventing satisfactory contact between the supercritical fluid and the lipids which results in incomplete separation of individual lipids.

Accordingly, there is a need in the art for a method for the highly-efficient extraction of relatively pure lipids from a lipid mixture using supercritical fluid extraction.

SUMMARY OF THE INVENTION

Figure 1:
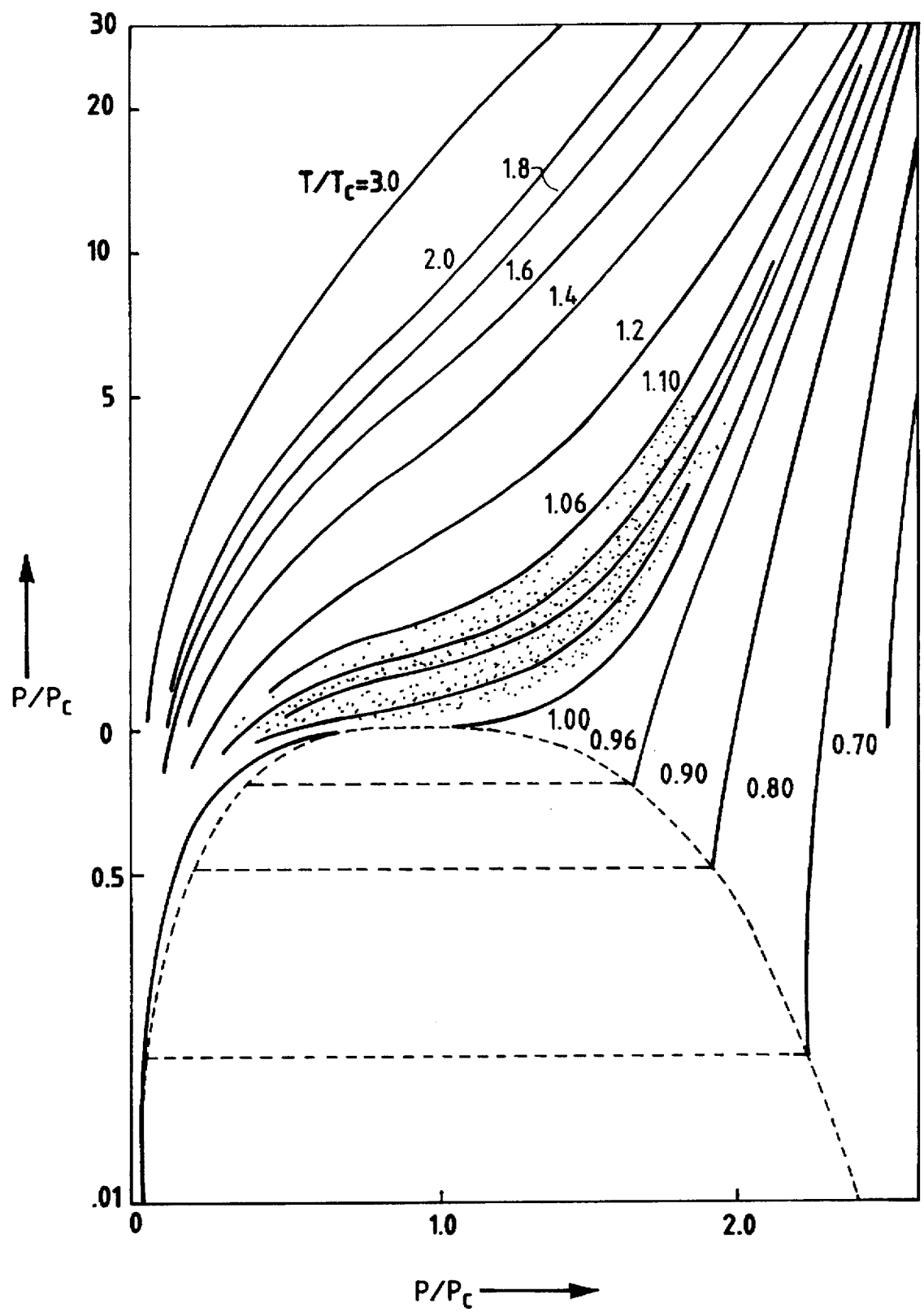
FIG. 1 shows the relationship between the density of carbon dioxide as a function of temperature and pressure.

The present invention provides a method for the separation of lipids using supercritical fluid extraction. Specifically, the invention provides methods for separation of lipids from a mixture of lipids comprising the use of an adsorbent material and a supercritical fluid. Any type of lipid may be isolated from a mixture of lipids using methods according to the invention. In a preferred embodiment, the invention provides a process for the separation of neutral lipids, mainly cholesterol and triglycerides, away from a sample containing such neutral lipids in admixture with polar lipids, particularly phospholipids and glycolipids. In a preferred embodiment, the invention provides means for isolating from tissue, preferably neural or bone marrow tissue, a polar lipid fraction thereof which contains individual polar lipids at a ratio corresponding to their ratio in the starting material. The separated lipid product may be combined with conventional adjuvants, e.g., a lubricant, in a formulation suitable for administration in capsule or other form.

Also according to the invention, a method for separation of lipids from a mixture of lipids is presented, the method comprising the steps of adsorbing the lipid mixture on an adsorbent material, exposing the adsorbent material with adsorbed lipid mixture to a supercritical fluid, and separating the adsorbent material from the supercritical fluid. The desired lipids (i.e. the lipids to be isolated from the mixture) are, depending upon the choice of adsorbent material and supercritical fluid, present either on the adsorbent material or in the supercritical fluid after extraction. According to a preferred embodiment of the invention, the desired lipids may be isolated from adsorbent material but, depending upon the type of adsorbent material used, such lipids may also be further used directly (i.e., in their adsorbed form). As noted throughout the specification, the type of lipid (i.e., polar, non-polar) which is isolated on the adsorbent material is a function of the adsorbent material and supercritical fluid used in methods of the invention. Accordingly, methods of the invention may also comprise the steps of adsorbing a mixture of lipids on an adsorbent material, exposing the adsorbent material to a supercritical fluid, isolating the supercritical fluid, and separating the desired lipids (i.e., the lipids to be isolated from the mixture) from the supercritical fluid by, for example, changing temperature and/or pressure.

The present invention involves using a supercritical extraction process for the separation of a mixture of lipids, especially for the separation of a mixture of neural lipids, in order to separate the neutral lipids, such as cholesterol and triglycerides from more polar lipids. Specifically, an object of the invention is to isolate lipids, wherein the isolated lipids are present at a ratio which corresponds to their ratio in the starting material. More particularly, methods of the invention are useful for the isolation of polar lipids in a tissue sample in a ratio corresponding to that in which they naturally occur in the tissue sample.

The present invention provides methods for extraction of a specific population of lipids from a mixture of lipids which have been extracted from a sample, such as bone marrow or neural tissue. A preferred method according to the present invention comprises adsorbing a mixture of lipids on an adsorbent material; exposing the adsorbent material to a supercritical fluid; and separating the supercritical fluid, which may be in a gaseous state, from the adsorbent material.

In a preferred method according to the invention, a lipid mixture is adsorbed onto an adsorbent material and then exposed to a supercritical fluid. The adsorbent material and supercritical fluid are then separated. Lipids adsorbed onto the adsorbent material may then be used directly or may be separated from the adsorbent material.

In a preferred embodiment of the invention, a supercritical fluid is selected from the group consisting of carbon dioxide, $SF_6$, Xe, $CH_2Cl_2F_2$ and $CHF_3$, methane, ethane, propane, n-butane, n-pentane, ethylene, propylene, acetone, toluene, ammonia, methanol, sulfur dioxide, water, and nitrous oxide.

In a preferred embodiment of the invention, adsorbent materials for use in claimed methods are selected from the group consisting of $SiO_2$ (silica gel), aluminum oxide, CaO, MgO, magnesium silicate, calcium phosphate, starch, celluloses, sugar, kieselguhr, and Fuller's earth. The foregoing are especially useful for adsorbing polar lipids away from neutral lipids in a mixture of polar and neutral lipids. Generally, adsorbent materials of a variety of commercial grades are available. A particularly preferred material is silica gel, especially one having an average particle size of approximately $12 \times 10^{-9}$ m and a surface area of $200 \pm 25$ $m^2/g$.

Using reverse phase adsorbent materials, polar substances are extracted with supercritical fluid according to the invention while the non-polar remain on the adsorbent material. Such adsorbent materials may be selected from silanized silica gel, such as silica with bonded octyl, octadecyl, cyanoalkyl, aminoalkyl, or diolalkyl groups, which provide less adsorptive packing material and a wide range of polarities for dipole-dipole and dipole-induced dipole interactions.

Methods according to the invention may be carried out with modifiers. Modifiers generally enhance the solvating power of the supercritical mobile phase. They also enhance solubility, especially for polar solutes or those with low volatility, thus making it possible to use lower pressure. Modifiers also enable modulation of the pressure-volume-temperature behavior of the supercritical fluid and improve selectivity and distribution coefficients. Choice of a particular modifier is within the knowledge of the skilled artisan. Generally, short-chain alcohols are used, as well as various organic acids, ethers, and esters. Frequently-used modifiers in supercritical fluid extraction generally are reported in *Analytical Supercritical Fluid Chromatography and Extraction*, (Lee, et al., eds., Chromatography Conferences, Inc., 1990).

Additional aspects and advantages of the present invention will become evident to the skilled artisan upon consideration of the following detailed description thereof.

DETAILED DESCRIPTION OF THE INVENTION

Numerous adsorbent materials and supercritical fluids may be used in methods according to the invention, including those described below. The specific adsorbent material and/or supercritical fluid used will depend upon the class of lipids to be isolated. Similarly, whether the temperature, pressure, or both are varied in order to precipitate the isolated lipids is a function of the nature of the supercritical fluid and the types of lipids one seeks to isolate. Provided below are examples of types of components used in methods according to the invention. The skilled artisan, guided by the present disclosure is able to choose specific components necessary for isolation of a desired class of lipids based upon physical chemical considerations and guidance provided herein.

According to methods of the invention, it is possible to achieve a selective and complete separation of polar and neutral lipids by adsorbing a lipid mixture onto a carrier (adsorbent material) and then subjecting the carrier to extraction with a supercritical fluid.

By adsorbing the lipid mixture to an adsorbent material, rather than subjecting the same to treatment with supercritical fluid in unabsorbed form, the lipid mixture is placed in a form which is not only easy to handle, but which makes it possible for the supercritical fluid to make better contact with the lipid and thus to facilitate and improve the extraction of the desired lipid type.

Depending upon the choice of adsorbent material, the supercritical fluid will selectively dissolve either the polar components or the non-polar components in the lipid mixture, which dissolved components are removed from the mixture and may be transported away with the resultant gas.

By controlling temperature and pressure conditions, as well as by varying the extraction time and optionally using modifiers, it is possible to optimize the selectivity of the process for any extraction agent and adsorbent material used and to obtain a highly-effective separation result. Such optimization is well within the skill of a person skilled in the art, guided by the present disclosure. For example, ethanol is a preferred modifier for $CO_2$.

After the extraction process, the adsorbent material contains those components of the lipid mixture which are retained through the action of various types of physical and chemical forces, and which are non-soluble in the fluid under supercritical conditions. The supercritical fluid, on the other hand, will dissolve those components which are not retained by the adsorbent material, but which dissolve in the fluid. The choice of adsorbent material will thus depend on the nature of the products to be separated and the nature of those which are to be retained on the adsorbent material.

The products which, at the separation stage, are dissolved in the supercritical fluid may be separated. Most commonly, separation is accomplished by changing a parameter, such as the pressure and/or the temperature to subcritical values, whereby the dissolving properties of the fluid will change, and the product will separate or the fluid will volatilize.

Where a mixture of, for example, neural lipids adsorbed on $SiO_2$ is extracted with supercritical $CO_2$, the product obtained after the extraction, i.e., the adsorbent material with adsorbed polar lipids, may be used without further modification or treatment. That product may be combined with additives to improve product handling characteristics, including lubricants (e.g., magnesium stearate), fillers (e.g., microcrystalline cellulose), anti-caking agents, and surface treatment agents for filling capsules.

A reverse phase adsorbent material may be used, for example, in the separation of soya lecithins from soya whereby the polar lipids as stated above are separated with the extraction fluid and subsequently recovered.

EXAMPLE I

From heat sterilized and freeze-dried tissue, such as brain or bone marrow from pig, reindeer, bovine, or other similar groups, lipids were first extracted with a mixture of ethanol diethylether (4:1 v/v, density 0.77 kg/$dm^3$). The solvent was then evaporated and the lipids were dissolved in acetone. Lipids were then adsorbed from the acetone solution onto finely divided silica, and the acetone was filtered off. The ratio of lipids to adsorbent material may vary within wide limits, from approximately 15% to approximately 75% by weight. A suitable amount in the case of silica of the aforementioned particle size and diameter is approximately 30% by weight.

Figure 2:
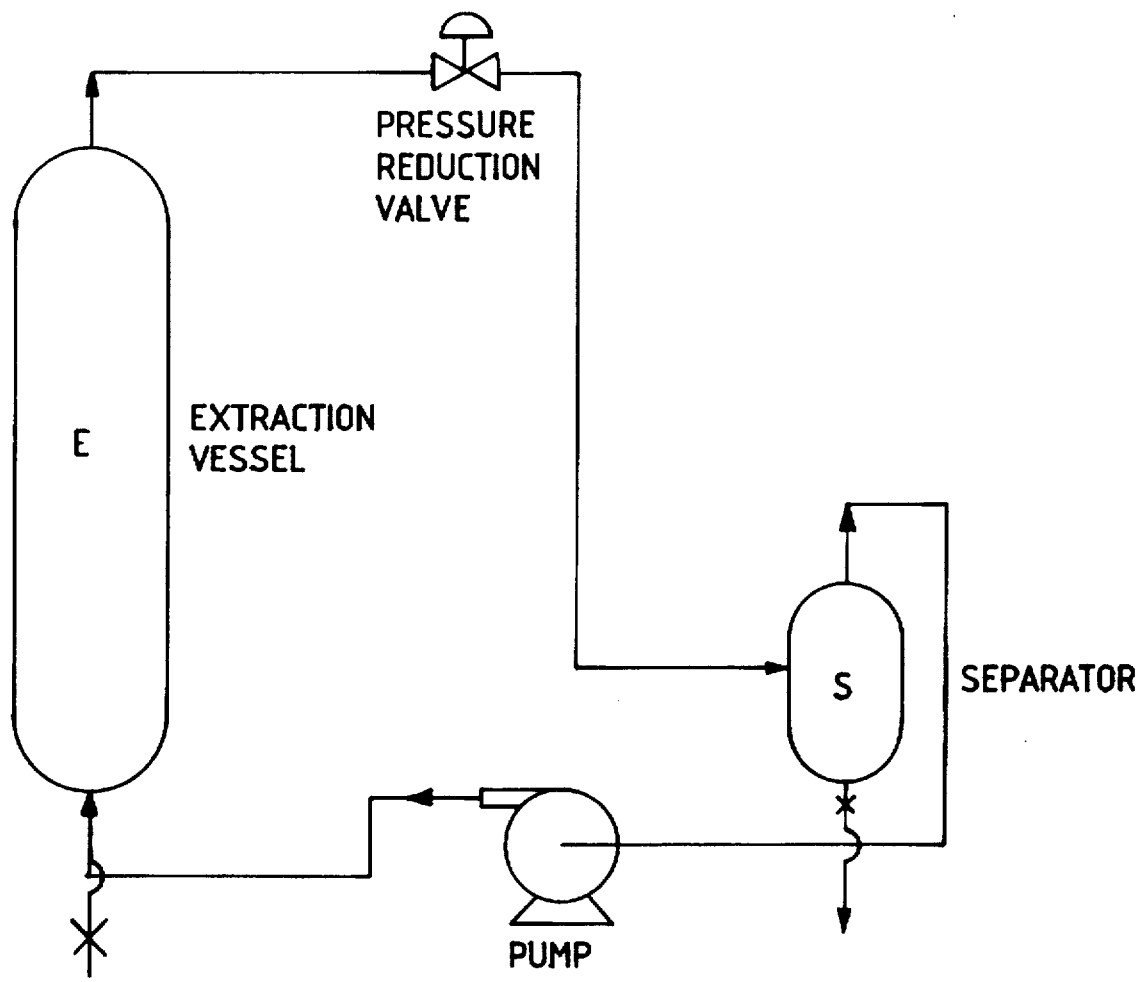
FIG. 2 is a schematic diagram of a system useful for supercritical fluid extraction according to the invention.

The obtained adsorbent material with adsorbed neurolipids was then charged into the extraction vessel, E, of the system shown in FIG. 2. Supercritical $CO_2$ was then fed into the extraction vessel from below. In the present example, the extraction vessel containing the adsorbent material was operated at a temperature of between 65°–75°C. and a pressure of about 600 bars, under which conditions the neutral lipids were removed almost quantitatively from the adsorbent material. After passing through the extraction vessel, the gas passed to a separation vessel, S, where its pressure was reduced to atmospheric pressure. Under such conditions, the gas volatilizes and the neutral lipids are separated. The resulting lipids are then removed from the separation vessel. An alternative means for separating the fluid with extracted lipids is to reduce the temperature. The gas may then be recirculated to the extraction vessel if desired.

The adsorbent material with adsorbed phospho- and glyco-lipids in pure form may be recovered through a valve at the bottom of the extraction chamber.

Example parameters for one test run are shown below in Table I:

TABLE I

| | |
|---|---|
| Extraction pressure, bar | 600 |
| Extraction temperature, °C | 65–75 |
| Extraction time, h | 1.75 |
| Mean $CO_2$-flow rate, kg/h | 3.0 |
| Consumed $CO_2$, kg | 5.3 |
| kg $CO_2$/kg extracted neutral lipids | 54 |
| Lipid extract concentration in silica (%) | 30.0 |
| Starting material (silica/lipid extract) g | 644.6 |
| Lipid extract at the start of test unit | 193.4 |
| Raffinate (silica/lipid extr.) after test, g | 547.0 |
| Weight loss during test, g | 97.6 |
| Weight loss as % of starting material | 15.1 |
| Weight loss as % of lipid extract | 50 |
| Extract collected, g | 102.0 |

Three mixed lipid samples were exposed to supercritical fluid extraction under the parameters identified above in Table I.

Figure 3A:
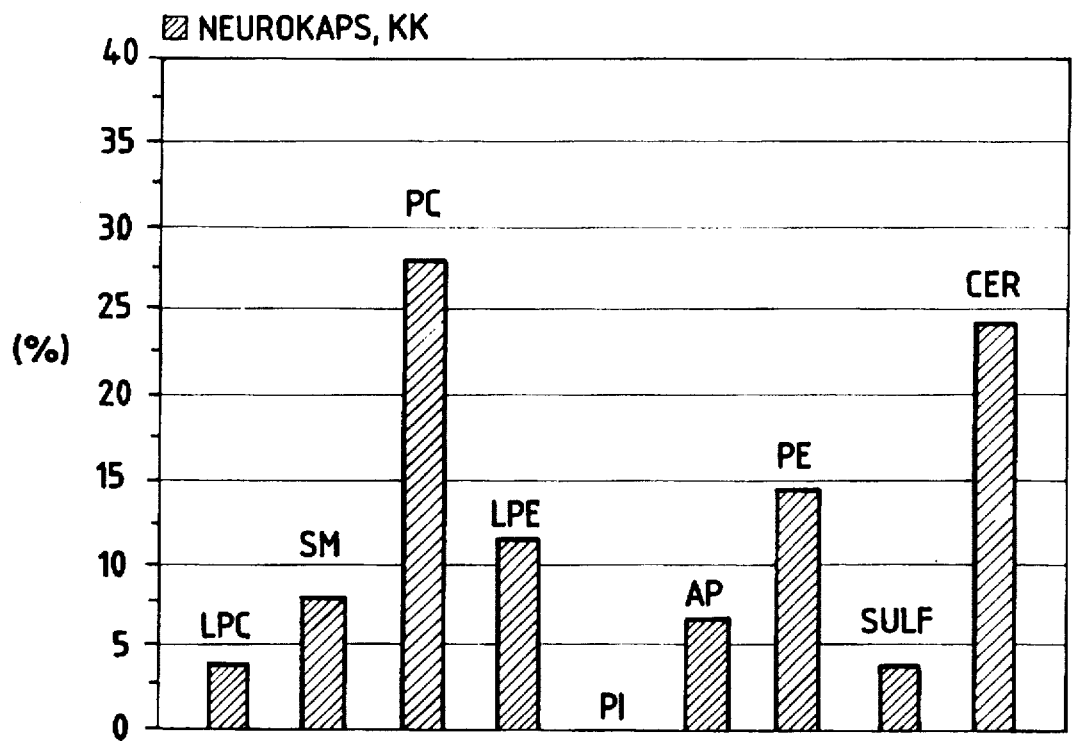
FIG. 3A shows the relative lipid composition of a commercially-available lipid preparation.
Figure 3B:
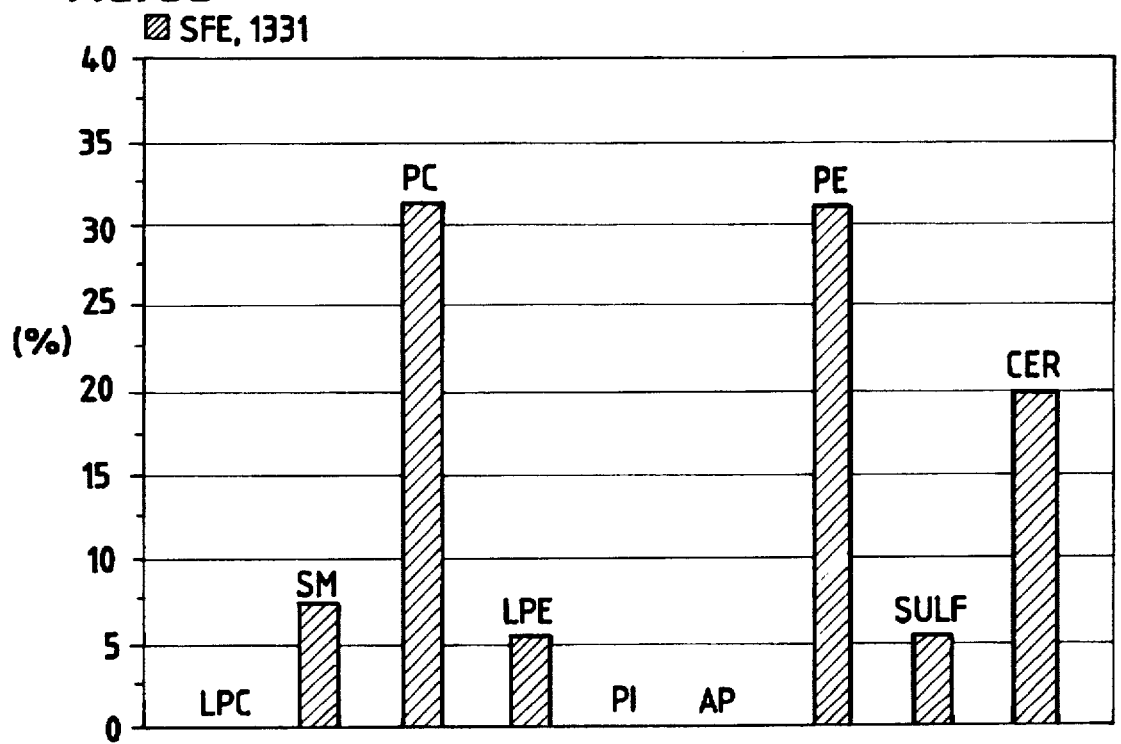
FIG. 3B shows the relative lipid composition of a lipid preparation obtained according to methods of the invention.

The lipid compositions of those samples as determined by supercritical fluid extraction were analyzed using thin layer chromatography combined with densitometry. The results are shown below in Table II. The results obtained for samples 1332 and 1333 show increased cholesterol levels, an indication of sub-optimal conditions. Results from sample 1331, showing numerous isolated lipids as a percentage of total lipid composition are shown in FIG. 3B. As a comparison, the composition of a well-known commercial preparation is shown in FIG. 3A. In FIGS. 3A and 3B, and in Table II, lysophosphatidylcholine is abbreviated as LPC, lysophosphatidylethanolamine as LDE, and phosphatidic acid as AP.

TABLE II

| Sample | 1331 | | 1332 | | 1333 | |
|---|---|---|---|---|---|---|
| lipid | mean % | range | mean % | range | mean % | range |
| LPC | 0.3 | — | + | | + | |
| SM | 1.3 | — | 0.9 | 0.7–1.1 | 0.6 | — |
| PC | 4.3 | — | 3.2 | 2.9–3.5 | 2.5 | 2.5–2.6 |
| LPE | 0.8 | 0.7–0.9 | 0.3 | 0.3–0.4 | 0.2 | — |
| PE | 3.6 | 3.5–3.7 | 3.4 | 3.1–3.8 | 2.7 | 2.6–2.8 |
| Sulf | 0.8 | 0.7–0.9 | 0.3 | 0.3–0.4 | 0.2 | 0.1–0.3 |
| Cereb | 2.5 | 2.4–2.7 | 2.4 | 2.2–2.5 | 2.0 | — |
| Chol. | 1.1 | — | 7.2 | 5.0–8.7 | 8.6 | 8.8–9.2 |
| Tri | + | | + | | + | |
| Tot. PL + GL | 13.6 | 13.5–13.7 | 10.4 | 9.7–11.7 | 8.2 | 8.0–8.4 |
| Tot. lipids | 14.8 | — | 17.5 | 16.6–18.6 | 17.2 | — |

Sample 1331, 65–75° C.
Sample 1332, 45–55° C.
Sample 1333, 50° C., pressure 350 bar
— indicates no value given or a range in values of zero.

From the foregoing data, it is evident that in Sample 1331 the extracted lipids are present in ratios which correspond to ratios present in the starting material and to those present in commercially-available products. Accordingly, supercritical fluid extraction of lipids according to the present invention provides a useful means for isolating specific lipids from mixtures of lipids and other materials in a manner such that extracted lipids are immediately available for further use.

EXAMPLE II

Figure 4A:
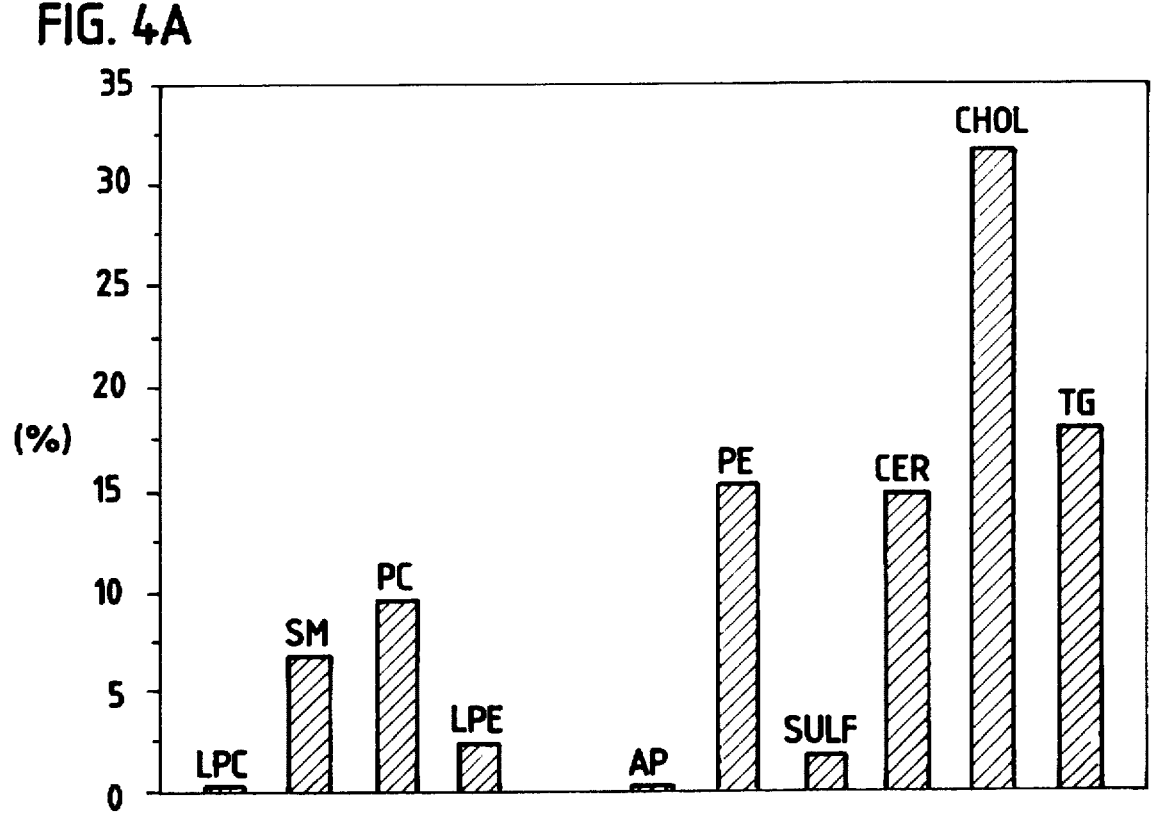
FIG. 4A shows the ratio of lipid in a sample prior to supercritical fluid extraction according to the invention.

Experiments similar to those described in Example I were also carried out on a larger scale. In such large-scale experiments, the starting material for extraction contained ⅓ silica and ⅔ lipid mixture obtained as described in the Example I. The total lipid weight was 22 kg. The lipid composition of the mixture is disclosed in the FIG. 4A. As shown in that Figure, the total cholesterol and triglyceride content of the starting mixture was greater than 50%.

The supercritical fluid extraction was carried out in a 301 stainless steel extraction vessel at a temperature of 50° C. and at an average pressure of approximately 200 bar. The supercritical fluid was carbon dioxide fed at a rate of 200 kg/h from below the extraction vessel, exiting at the top. No modifier was added. The extraction took approximately 4 hours, after which time about 5 kg of residual fat was collected (cholesterol and other residual fat components). The desired polar lipids remained on the adsorbent material.

Figure 4B:
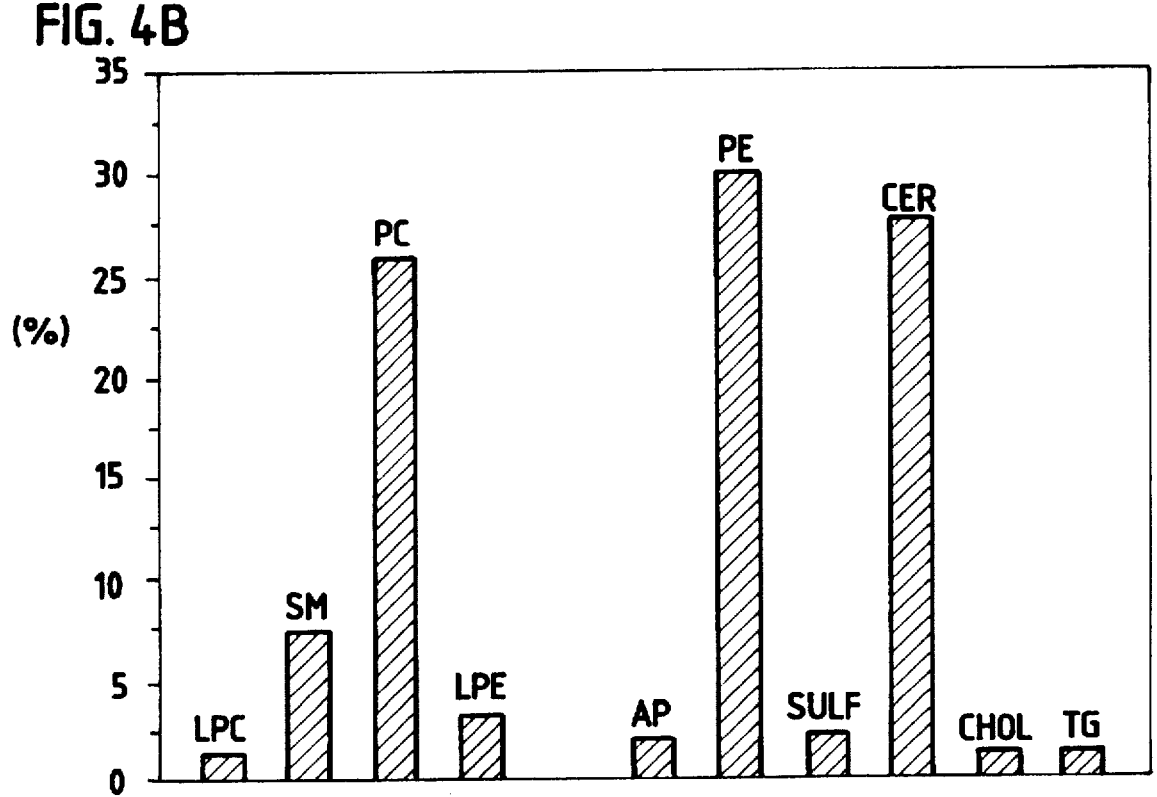
FIG. 4B shows the ratio of lipid in a sample of extracted lipids after supercritical fluid extraction of the material shown in FIG. 4A.

Eight samples (sample nos. 1 to 8) were removed from the extractor at eight different levels spaced over the height of the extractor, sample 8 being closest to bottom and sample 1 closest to the top of the extractor. The content of lipids in each sample is shown in the Table III below, indicating the mean amount for each component. Sample 9 was isolated from the supercritical fluid at the beginning of extraction and sample 10 was isolated at the end of the extraction. The results presented in Table III show that supercritical fluid extraction according to the present invention results in relatively complete extraction of a specified class of lipids in amounts corresponding to the amounts present in the starting material from which the lipids were extracted. For example, sample 8 is largely free of neutral lipid (cholesterol and triglycerides); whereas the amount of polar lipids is about the same as in the starting material. The composition of sample 5 from Table III is graphically presented in FIG. 4B, showing that the ratio of the desired polar lipids corresponds to their ratio in the starting material shown in FIG. 4A. FIG. 4B also shows that the neutral lipids were largely removed.

tional embodiments 10 thereof are within the scope of the invention. Accordingly, the invention should be limited only by the scope of the appended claims.

We claim:

1. An industrial method of separating polar lipids and neutral lipids from each other, said method comprising the steps of:
   (a) adsorbing a mixture of polar lipids and neutral lipids on an adsorbent material;
   (b) exposing said adsorbent material with said lipid mixture adsorbed thereon to a supercritical fluid whereby either neutral lipids or polar lipids are extracted from said adsorbent material by said supercritical fluid and the other of said neutral lipids and said polar lipids remain adsorbed on said adsorbent material; and,
   (c) separating said adsorbent material from said supercritical fluid.

2. The method according to claim 1, further comprising the step of isolating said lipids adsorbed onto said adsorbent material or contained in said supercritical fluid.

3. The method according to claim 1 wherein said adsorbent material is selected from the group consisting of $SiO_2$, aluminum oxide, CaO, MgO, MgSi, calcium phosphate, starch, cellulose, kieselguhr, and Fuller's earth.

4. The method according to claim 1 wherein said adsorbent material is silica gel having an average particle diameter of about $12 \times 10^{-9}$ m and a surface area of about 175–225 $m^2/g$.

5. The method according to claim 1 wherein said supercritical fluid is selected from the group consisting of $CO_2$, $SF_6$, $CH_2Cl_2F_2$, $CHF_3$, methane, ethane, propane, n-butane, n-pentane, ethylene, propylene, acetone, toluene, ammonia, methanol, sulfur dioxide, water, and nitrous oxide.

6. The method according to claim 1 wherein said adsorbent material is silanized silica gel.

7. The method according to claim 6, wherein said adsorbent material comprises silica bound to an alkyl group selected from the group consisting of octyl, octadecyl, cyanoalkyl, aminoalkyl, and dialkyl groups.

8. The method according to claim 1,wherein the adsorbent material is $SiO_2$ and the supercritical fluid is $CO_2$.

9. The method according to claim 1, wherein the lipids contained in the supercritical fluid are isolated by changing the temperature or pressure, or both.

TABLE III

| SAMPLE | AVERAGE (%) | | | | | | | | | |
|---|---|---|---|---|---|---|---|---|---|---|
| | 1 | 2 | 3 | 4 | 5 | 6 | 7 | 8 | 9 | 10 |
| LPC | 0.3 | 0.3 | 0.3 | 0.3 | 0.4 | 0.3 | 0.3 | 0.3 | 0.3 | — |
| SM | 2.1 | 1.8 | 1.9 | 1.9 | 2.3 | 2.2 | 2.1 | 2.5 | 0.7 | — |
| PC | 7.3 | 6.9 | 7.0 | 7.0 | 8.0 | 7.3 | 6.7 | 7.4 | 2.8 | 0.5 |
| LPE | | | | | | | | | | |
| Phosphatidyl | 1.2 | 1.0 | 1.0 | 1.0 | 1.0 | 1.0 | 0.9 | 1.1 | 0.3 | — |
| Serine | + | + | + | + | + | + | + | + | — | — |
| AP | 0.5 | 0.6 | 0.4 | 0.5 | 0.6 | 0.5 | 0.5 | 0.6 | — | — |
| PE | 9.1 | 9.1 | 8.1 | 9.0 | 9.3 | 7.2 | 6.7 | 7.6 | 3.0 | — |
| Sulf | 0.8 | 0.7 | 0.8 | 0.9 | 0.7 | 0.7 | 0.7 | 0.7 | — | — |
| Cer | 8.4 | 8.2 | 8.6 | 8.8 | 8.6 | 8.0 | 7.6 | 8.9 | 2.8 | 1.2 |
| Chol | 22.7 | 25.4 | 10.2 | 7.2 | 4.5 | 4.3 | 3.2 | 3.4 | 81.6 | 32.1 |
| TG | 0.4 | 0.9 | 0.7 | 0.6 | 0.4 | 0.4 | 0.3 | 0.7 | 0.8 | 45.8 |
| TOTAL PL | 30.0 | 28.8 | 28.1 | 29.5 | 30.9 | 27.0 | 25.5 | 29.1 | 9.8 | 1.7 |

The percentages given in Tables II and III are weight percentages.

The foregoing example and recitation of preferred embodiments of the invention are provided for illustrative purposes and the skilled artisan, upon consideration of the invention described herein, understands that numerous addi- 10. An industrial method of separating polar lipids and neutral lipids from each other, said method comprising the steps of:
    (a) adsorbing a mixture of polar lipids and neutral lipids on an adsorbent material;

(b) exposing said adsorbent material with said lipid mixture adsorbed thereon to a supercritical fluid whereby neutral lipids are extracted from said adsorbent material by said supercritical fluid and said polar lipids remain adsorbed on said adsorbent material; and, (c) separating said adsorbent material from said supercritical fluid.

11. The method of claim 10 comprising the further step of isolating said neutral lipids from said supercritical fluid and/or isolating said polar lipids from said adsorbent material.

12. The method according to claim 10 wherein said adsorbent material is selected from the group consisting of $SiO_2$, aluminum oxide, CaO, MgO, MgSi, calcium phosphate, starch, cellulose, kieselguhr, and Fuller's earth.

13. The method according to claim, 10 wherein said adsorbent material is silica gel having an average particle diameter of $12 \times 10^{-9}$ m and a surface area of about 175–225 $m^2/g$.

14. The method according to claim 10 wherein said supercritical fluid is selected from the group consisting of $CO_2$, $SF_6$, $CH_2Cl_2F_2$, $CHF_3$, methane, ethane, propane, n-butane, n-pentane, ethylene, propylene, acetone, toluene, ammonia, methanol, sulfur dioxide, water, and nitrous oxide.

15. The method according to claim 10 wherein said adsorbent material is silanized silica gel.

16. The method according to claim 15 wherein said adsorbent material comprises silica bound to an alkyl group selected from the group consisting of octyl, octadecyl, cyanoalkyl, aminoalkyl, and dialkyl groups.

17. The method according to claim 10 wherein the adsorbent material is $SiO_2$ and the supercritical fluid is $CO_2$.

18. The method according to claim 10 wherein the lipids contained in the supercritical fluid are isolated by changing the temperature or pressure, or both.

19. An industrial method of separating polar lipids and neutral lipids from each other, said method comprising the steps of:

(a) adsorbing a mixture of polar lipids and neutral lipids on an adsorbent material;

(b) exposing said adsorbent material with said lipid mixture adsorbed thereon to a supercritical fluid whereby polar lipids are extracted from said adsorbent material by said supercritical fluid and said neutral lipids remain adsorbed on said adsorbent material; and, (c) separating said adsorbent material from said supercritical fluid.

20. The method of claim 19 comprising the further step of isolating said polar lipids from said supercritical fluid and/or isolating said neutral lipids from said adsorbent material.

21. The method according to claim 19 wherein said adsorbent material is selected from the group consisting of $SiO_2$, aluminum oxide, CaO, MgO, MgSi, calcium phosphate, starch, cellulose, kieselguhr, and Fuller's earth.

22. The method according to claim 19 wherein said adsorbent material is silica gel having an average particle diameter of $12 \times 10^{-9}$ m and a surface area of about 175–225 $m^2/g$.

23. The method according to claim 19 wherein said supercritical fluid is selected from the group consisting of $CO_2$, $SF_6$, $CH_2Cl_2F_2$, $CHF_3$, methane, ethane, propane, n-butane, n-pentane, ethylene, propylene, acetone, toluene, ammonia, methanol, sulfur dioxide, water, and nitrous oxide.

24. The method according to claim 19 wherein said adsorbent material is silanized silica gel.

25. The method according to claim 24 wherein said adsorbent material comprises silica bound to an alkyl group selected from the group consisting of octyl, octadecyl, cyanoalkyl, aminoalkyl, and dialkyl groups.

26. The method according to claim 19 wherein the adsorbent material is $SiO_2$ and the supercritical fluid is $CO_2$.

27. The method according to claim 19 wherein the lipids contained in the supercritical fluid are isolated by changing the temperature or pressure, or both.

* * * * *